US012798289B2

(12) United States Patent
Avalur Nagarajan

(10) Patent No.: US 12,798,289 B2
(45) Date of Patent: Nov. 17, 2026

(54) TIRE FLANGE AND BEAD SEAT ASSEMBLY FOR A MULTI-PIECE WHEEL RIM

(71) Applicant: WHEELS INDIA LIMITED, Chennai (IN)

(72) Inventor: Balaji Avalur Nagarajan, Chennai (IN)

( * ) Notice: Subject to any disclaimer, the term of this patent is extended or adjusted under 35 U.S.C. 154(b) by 0 days.

(21) Appl. No.: 18/159,098

(22) PCT Filed: Dec. 15, 2022

(86) PCT No.: PCT/IB2022/062281
§ 371 (c)(1),
(2) Date: Jan. 25, 2023

(87) PCT Pub. No.: WO2024/115960
PCT Pub. Date: Jun. 6, 2024

(65) Prior Publication Data

US 2025/0282173 A1 Sep. 11, 2025

(30) Foreign Application Priority Data

Dec. 1, 2022 (IN) ............................. 202241069260

(51) Int. Cl.
*B60B 25/12* (2006.01)

(52) U.S. Cl.
CPC .................................... *B60B 25/12* (2013.01)

(58) Field of Classification Search
CPC ......... B60B 25/12; B60B 25/10; B60B 25/04; B60B 25/00
See application file for complete search history.

(56) References Cited

U.S. PATENT DOCUMENTS

| | | | | |
|---|---|---|---|---|
| 4,574,859 A * | 3/1986 | Smith | ...................... B60B 25/04 152/410 |
| 2003/0140998 A1* | 7/2003 | Oba | ......................... B60B 25/10 152/410 |

FOREIGN PATENT DOCUMENTS

| | | | |
|---|---|---|---|
| RU | 2764933 C1 * | 1/2022 | ............. B60B 25/00 |
| WO | WO-2020194072 A1 * | 10/2020 | ............. B60B 25/14 |

* cited by examiner

*Primary Examiner* — Cedrick S Williams
(74) *Attorney, Agent, or Firm* — Preston Smirman; SMIRMAN IP LAW, PLLC

(57) ABSTRACT

The present disclosure provides a tire flange and bead seat assembly for a multi-piece wheel rim. The tire flange and bead seat assembly includes at least one tire flange (101) and at least one bead seat (201). The tire flange (101) includes an end face (**103*a*) and a circumferentially extending tapered radially inward surface (103*b*). A first tapered surface (203*a*) includes a taper with angle $\theta_1$ configured on a circumferentially extending radially outward surface (205*a*) of the bead seat and a second tapered surface (203*b*) includes a taper with angle $\theta_2$ configured on a circumferentially extending radially inward surface (205*b*) of the bead seat (201). The circumferentially extending tapered radially inward surface (103*b*) includes a taper matching the taper of the first tapered surface (203*a*) and the circumferentially extending tapered radially inward surface (103*b*) of the tire flange mounted completely within the first tapered surface (203*a***) of the bead seat.

7 Claims, 8 Drawing Sheets

TIRE FLANGE AND BEAD SEAT ASSEMBLY FOR A MULTI-PIECE WHEEL RIM

FIELD

The embodiments herein generally relate to a multi-piece wheel rim assembly. More particularly, the disclosure relates to a bead seat and a tire flange of a multi piece wheel rim of vehicles used in construction and mining equipment.

BACKGROUND AND PRIOR ART

Wheels are generally categorized as single piece wheels and multi piece wheels. Multi-piece wheels commonly constitute a wheel rim and a wheel disc, wherein the wheel disc is welded to the wheel rim.

Generally, in a multi-piece rim, the tire flange of the wheel rim is mounted on the bead seat band. As illustrated in the prior art shown in FIG. 6A and FIG. 6B, a radial clearance is provided between circumferentially extending radially inner surface of the tire flanges (403, 416) and circumferentially extending radially outer surface of the bead seats (412,415) for facilitating mounting of the tire flanges (403, 416). The FIG. 7 clearly illustrates the radial clearance 701 provided between the tire flange and the bead seat. Due to this clearance, a small slippage occurs between the tire flange and the bead seat band during every rotation of the wheel during operation, thereby resulting in fretting related fatigue on both the components. Fretting between the components of the multi-piece wheel rim reduces the life of the components.

Further, to address the problem of fretting, prior arts disclose a wheel rim wherein the tire flange has increased thickness. Also, the existing tire flange and bead seat assembly of a multi-piece wheel rim includes the radially extending axially outward surface of the tire flange in contact with the radially extending axially inward surface of the bead seat flange upon tire inflation wherein, the tire force acting on the tire flange will induce high stresses at the corners wherein the radially extending axial inward surface of bead seat and circumferentially extending radially outward tapered surface intersect in the respective bead seats. Thereby, the high stress may result in reduction in life of the bead seats.

Therefore, there is a need for an improved tire flange and bead seat assembly of a multi-piece wheel rim for preventing fretting. Moreover, there is a need for a tire flange and bead seat assembly with reduced stresses and imparting improved life of the multi-piece wheel rim.

OBJECTS

Some of the objects of the present disclosure are described herein below:

The main objective of the present disclosure is to provide a tire flange and bead seat assembly of a multi-piece wheel rim.

Another objective of the present disclosure is to provide a tire flange and bead seat assembly of a multi-piece wheel rim for preventing fretting.

Still another objective of the present disclosure is to provide a tire flange and bead seat assembly for reducing stress and enhancing rigidity on the bead seat band of a multi piece wheel rim Yet another objective of the present disclosure is to provide a tire flange and bead seat assembly for reducing weight of the wheel rim by providing a tire flange with reduced thickness.

The other objectives and advantages of the present disclosure will be apparent from the following description when read in conjunction with the accompanying drawings, which are incorporated for illustration of preferred embodiments of the present disclosure and are not intended to limit the scope thereof.

SUMMARY

In view of the foregoing, an embodiment herein provides a tire flange and bead seat assembly of a multi-piece wheel rim.

In accordance with an embodiment, the multi-piece wheel rim comprises at least one tire flange and at least one bead seat. The tire flange includes an end face and a circumferentially extending tapered radially inward surface. The bead seat includes a first tapered surface including a taper with angle of inclination $\theta_1$ configured on a circumferentially extending radially outward surface and a second tapered surface including a taper with angle of inclination $\theta_2$ configured on a circumferentially extending radially inward surface. The circumferentially extending tapered radially inward surface of the tire flange is provided with a taper matching the taper of the first tapered surface and the circumferentially extending tapered radially inward surface of the tire flange is mounted completely within the first tapered surface of the bead seat upon tire inflation.

In accordance with an embodiment, the tire flange includes a radially extending axially outward surface and a radially extending axially inward surface, wherein the radially extending axially outward surface is divided into an upper surface and a lower surface. A thickness T1 is formed between the upper surface and the radially extending axially inward surface and a thickness T2 is formed between the lower surface and the radially extending axially inward surface, wherein the thickness T2 is less than the thickness T1 for providing a clearance between the lower surface and a radially extending axially inward flange surface of a bead seat flange.

In accordance with an embodiment, an outer fillet is provided at an edge between a radially extending axially outward surface of the tire flange and the circumferentially extending tapered radially inward surface and an inner fillet is provided at the edge between a radially extending axially inward surface of the tire flange and the circumferentially extending tapered radially inward surface for reducing stress concentration on the tire flange.

In accordance with an embodiment, the angle of inclination $\theta_1$ is greater than the angle of inclination $\theta_2$ for gradually increasing section in critical region of the bead seat under load, thereby enhancing rigidity of the bead seat and restricting the tire flange in not establishing contact with a radially extending axially inward flange surface of the bead seat upon tire inflation.

In accordance with an embodiment, the thickness T1 and T2 of the tire flange is determined based on load acting on the wheel, thereby reducing weight of the wheel.

These and other aspects of the embodiments herein will be better appreciated and understood when considered in conjunction with the following description and the accompanying drawings. It should be understood, however, that the following description, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

LIST OF NUMERALS

Figure 1:
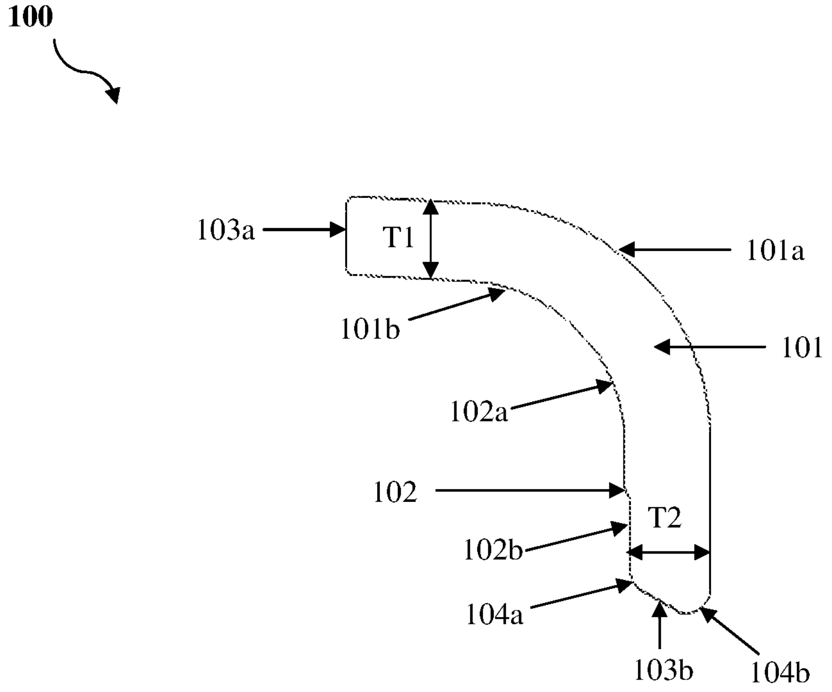
FIG. 1 illustrates a sectional view of a tire flange of the multi-piece wheel rim, according to an embodiment herein.

101—Tire flange
101*a*—Radially extending axially inward surface
101*b*—Radially extending axially outward surface
102—Transition point
102*a*—Upper surface
102*b*—Lower surface
103*a*—End face
103*b*—Circumferentially extending tapered radially inward surface
104*a*—Outer fillet
104*b*—Inner fillet
201—Bead seat band
203*a*—First tapered surface
203*b*—Second tapered surface
205*a*—Circumferentially extending radially outward surface
205*b*—Circumferentially extending radially inward surface
207—Bead seat flange
207*a*—Radially extending axially inward flange surface
401—Rim
403—Gutter region
405—Saddle ring
407—Endless ring
70—Radial clearance

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need for an improved tire flange and bead seat assembly of a multi-piece wheel rim for preventing fretting. In particular, there is a need for a tire flange and bead seat assembly with reduced stresses and imparting improved life of the multi-piece wheel rim. The embodiments herein achieve this by providing "A tire flange and bead seat assembly for a multi-piece wheel rim". Referring now to the drawings and more particularly to FIG. 1 to FIG. 4 where similar reference characters denote corresponding features consistently throughout the figures, there are shown preferred embodiments.

FIG. 1 illustrates a sectional view of a tire flange of the multi-piece wheel rim. The tire flange 101 includes an end face 103*a* and a circumferentially extending tapered radially inward surface 103*b*, a radially extending axially outward surface 101*b*, and a radially extending axially inward surface 101*a*. In an embodiment, a transition point 102 divides the radially extending axially outward surface 101*b* of the tire flange into an upper surface 102*a* and a lower surface 102*b*. The tire flange includes a first thickness T1 formed between the radially extending axially inward surface 101*a* and the upper surface 102*a*, and a second thickness T2 formed between the radially extending axially inward surface 101*a* and the lower surface 102*b*. In an embodiment, the first thickness T1 is greater than the second thickness T2.

In an embodiment, the circumferentially extending tapered radially inward surface 103*b* is tapered for matching a taper of a bead seat. The circumferentially extending tapered radially inward surface 103*b* is a circumferentially extending radially inward surface of the tire flange 101 including a single taper.

In an embodiment, the circumferentially extending tapered radially inward surface 103*b* includes an outer fillet 104*a*, and an inner fillet 104*b*. The outer fillet 104*a* is provided at the edge between the radially extending axially outward surface 101*b* and the circumferentially extending tapered radially inward surface 103*b* and the inner fillet 104*b* is provided at the edge between the radially extending axially inward surface 101*a* and the circumferentially extending tapered radially inward surface 103*b* for preventing stress concentration on the tire flange.

Figure 2:
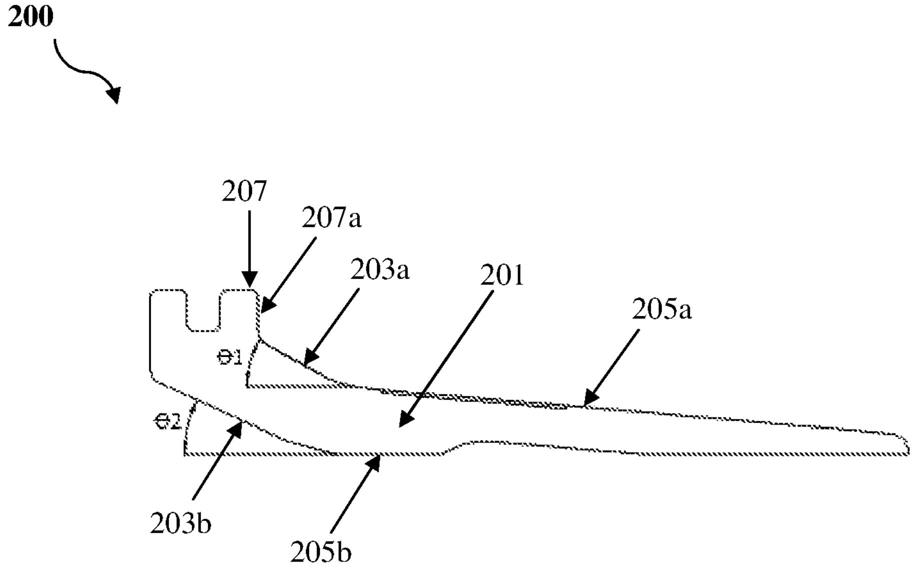
FIG. 2 illustrates a sectional view of a bead seat of the multi-piece wheel rim, according to an embodiment herein.

FIG. 2 illustrates a sectional view of a bead seat of the multi-piece wheel rim. In an embodiment, the bead seat 201 includes a circumferentially extending radially outward surface 205*a* and a circumferentially extending radially inward surface 205*b*. The circumferentially extending radially outward surface 205*a* includes a first tapered surface 203*a*. The first tapered surface 203*a* is provided for supporting the tire flange of the wheel rim. The circumferentially extending radially inward surface 205*b* includes a second tapered surface 203*b*.

The bead seat 201 includes a bead seat flange 207, wherein the bead seat flange 207 includes a radially extending axially inward flange surface 207*a*.

In an embodiment, the first tapered surface 203*a* is inclined at an angle $\theta_1$ relative to the horizontal. In an embodiment, the second tapered surface 203*b* is inclined at an angle $\theta_2$ relative to the horizontal. The angle $\theta_1$ of the first tapered surface is greater than the angle of inclination $\theta_2$ of the second tapered surface.

Figure 3:
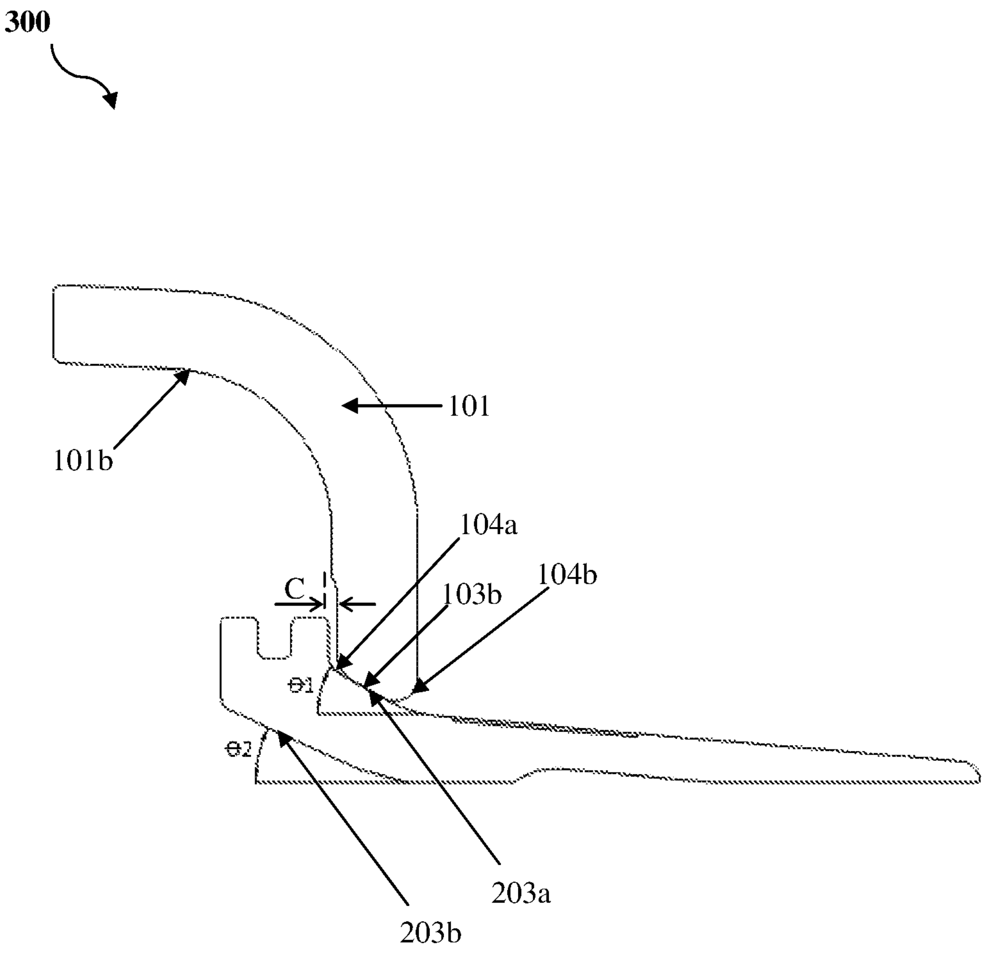
FIG. 3 illustrates a tire flange and bead seat assembly of the multi-piece wheel rim, according to an embodiment herein.

FIG. 3 illustrates a tire flange and bead seat assembly of the multi-piece wheel rim. In an embodiment, the circumferentially extending tapered radially inward surface 103*b* of the tire flange 101 is mounted on the first tapered surface 203*a* of the bead seat. In an embodiment, the lower surface 102*b* of the tire flange forms a clearance C relative to the radially extending axially inward flange surface 207*a* upon tire inflation, thereby preventing contact between the tire flange 101 and the bead seat flange 207.

Dimensions of the first tapered surface 203*a* and the second tapered surface 203*b* of the bead seat 201 are determined based on load acting by tire forces to ensure rigidity of bead seat band wherein engagement of the tire flange 101 is restricted to the first tapered surface 203*a* of the bead seat and does not establish contact with the radially extending axially inward flange surface 207*a* of the bead seat band.

In an embodiment, the taper of the circumferentially extending tapered radially inward surface 103*b* of the tire flange matches the taper of the first tapered surface 203*a* of the bead seat. The circumferentially extending tapered radially inward surface 103*b* is completely engaged within the first tapered surface 203*a* of the bead seat.

Figure 4:
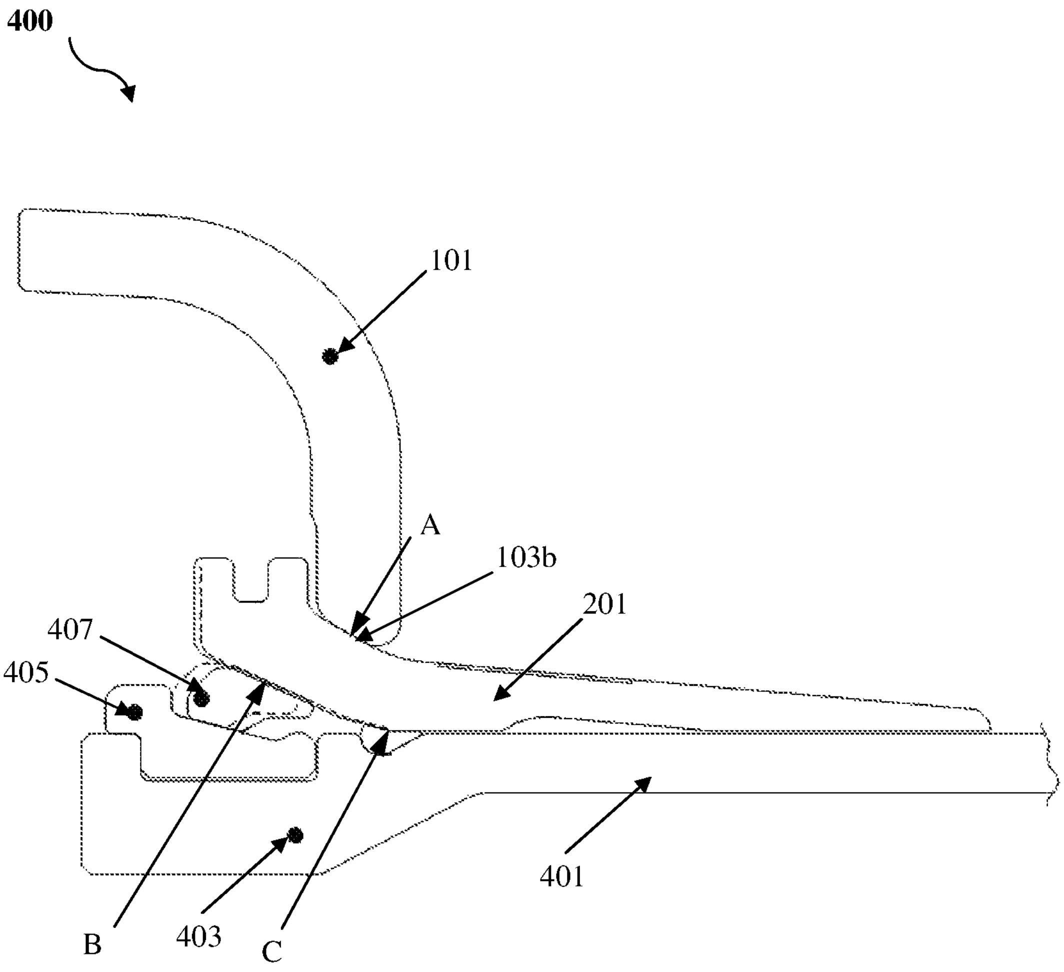
FIG. 4 illustrates a multi piece wheel rim assembly showing rim base, saddle ring, endless ring, bead seat and tire flange, according to an embodiment herein.

FIG. 4 illustrates a multi piece wheel rim assembly showing rim base, saddle ring, endless ring, bead seat and tire flange, according to an embodiment. The wheel includes a rim 401, a gutter region 403, a saddle ring 405 and an endless ring 407. The circumferentially extending tapered radially inward surface 103*b* of the tire flange 101 is mounted on the bead seat 201 at the first tapered surface 203*a*. Upon tire inflation, the circumferentially extending tapered radially inward surface 103*b* is completely mounted within the first tapered surface 203*a* thereby the tire flange 101 not establishing contact with the radially extending axially inward flange surface 207*a* of the bead seat 201 and preventing fretting. In an embodiment, a tire force A from the tire flange acts on the first tapered surface 203*a* of the bead seat, wherein the tire force A is supported by reactions B and C acting on the second tapered surface 203*b* of the bead seat. As the tire flange 101 and bead seat 201 assembly, restricts engagement of the tire flange 101 within the first tapered surface 203*a* of the bead seat, the bead seat acts a simply supported beam, thereby reducing stresses induced in the bead seat and enhancing the life of both the tire flange and bead seat of the multi-piece wheel rim.

In an embodiment, the angle of inclination $\theta_2$ of the second tapered surface 203*b* being lesser than the angle of inclination $\theta_1$ of the first tapered surface imparts a gradually increasing section in the critical region under the load of the bead seat and enhances rigidity of the bead seat 201.

Figure 5A:
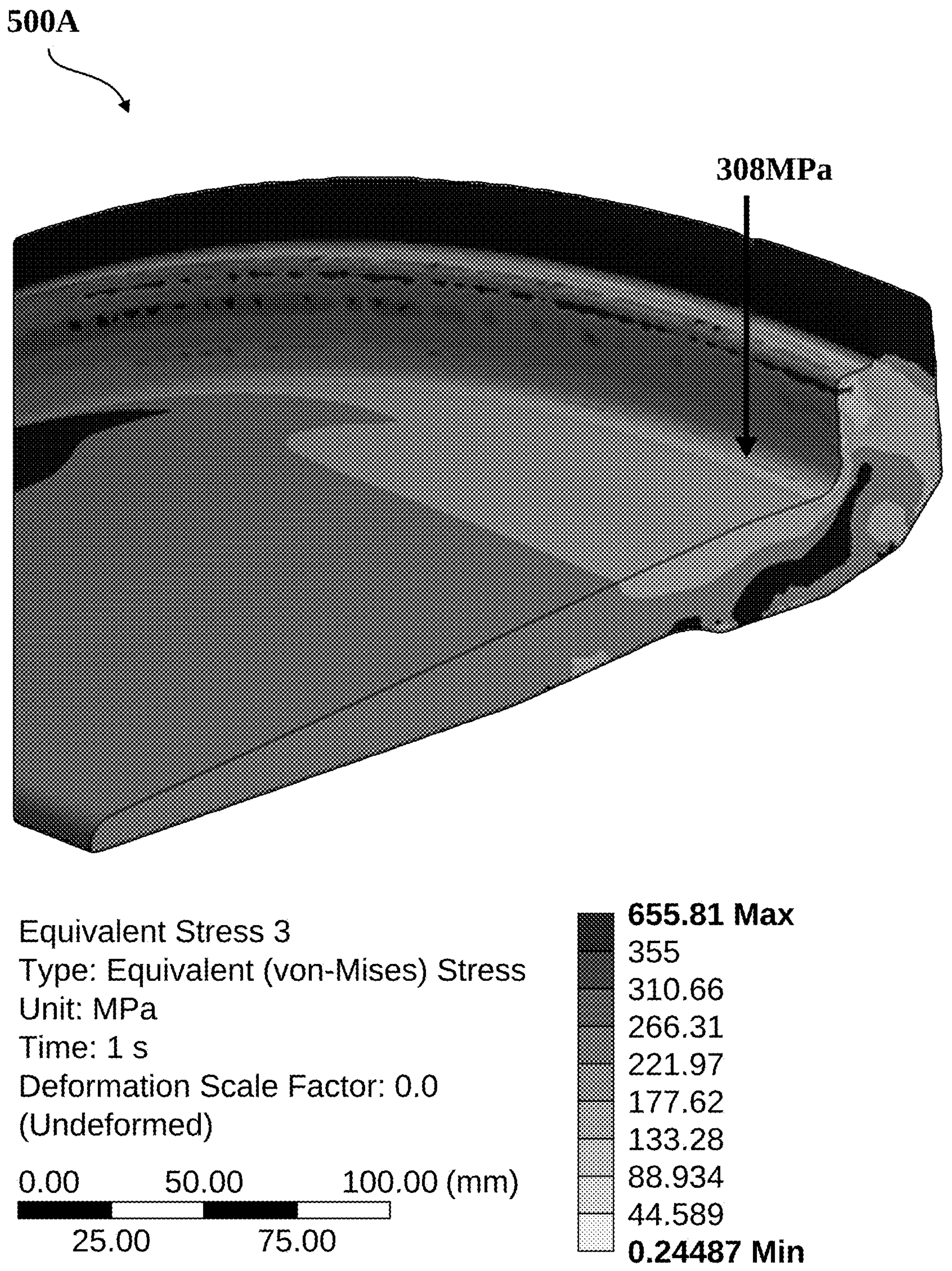
FIG. 5A (Prior art)
FIG. 5*a* illustrates exemplary stresses acting on bead seat of a multi piece wheel rim, according to prior art.
Figure 5B:
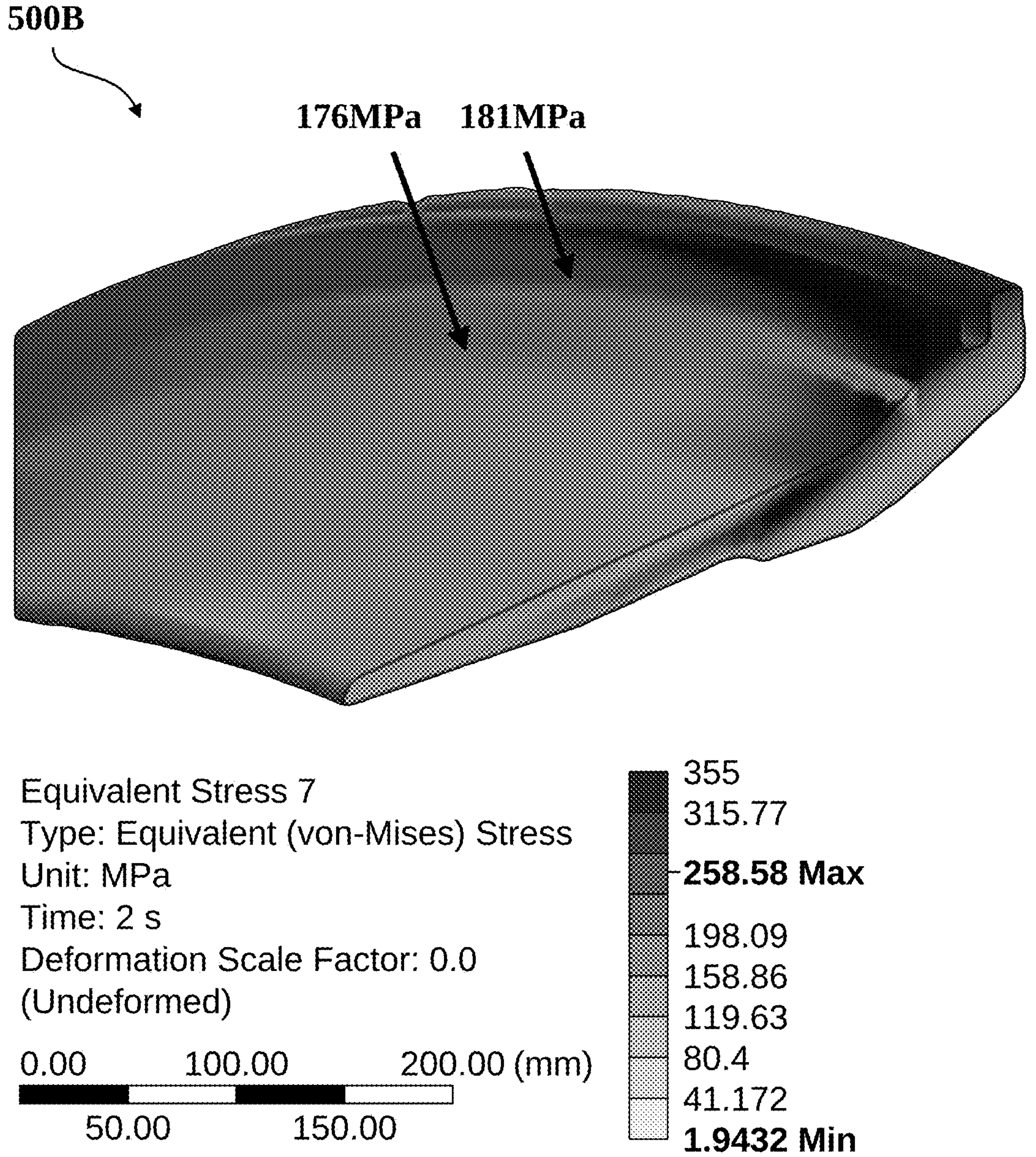
FIG. 5*b* illustrates stresses acting on the bead seat of the multi piece wheel rim, according to an embodiment herein.
Figure 6A:
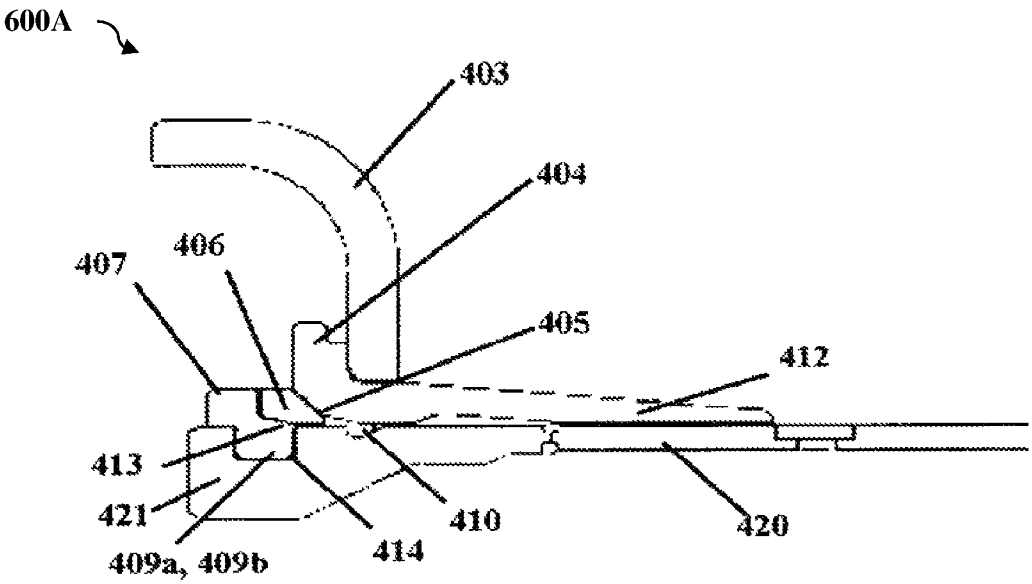
FIG. 6A (Prior art)
FIG. 6*a* illustrates a multi piece wheel rim assembly with saddle lock ring according to prior art.
Figure 6B:
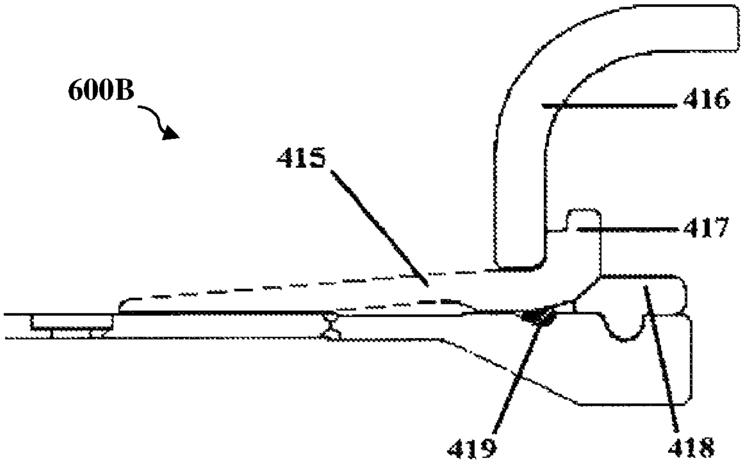
FIG. 6B (Prior art)
FIG. 6*b* illustrates a multi piece wheel rim assembly with conventional split lock ring, according to prior art.
Figure 7:
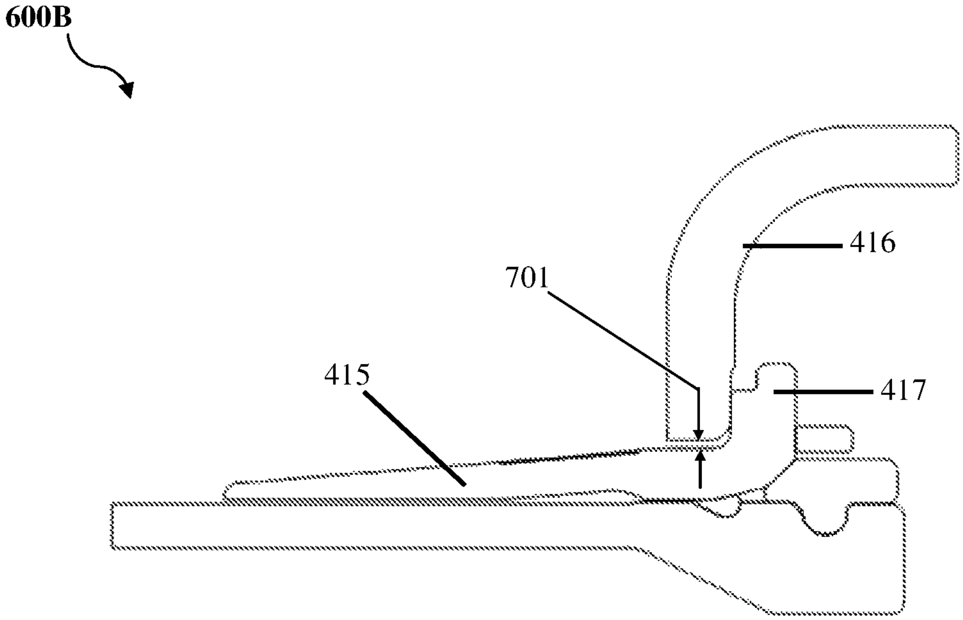
FIG. 7 illustrates a conventional multi piece wheel rim assembly showing radial clearance between tire flange and bead seat band, according to prior art.

FIG. 5*a* illustrates exemplary stresses acting on a prior art bead seat of a multi piece wheel rim, designed for use in a 57 inch wheel of a 240T mining dump truck. FIG. 5*b* illustrates stresses acting on the bead seat of the multi piece wheel rim, according to an embodiment, wherein the multi-piece wheel rim is designed for use in the same 57 inch wheel of 240T mining dump truck. As illustrated, values of stresses of bead seat are lower approximately by 40% as against the stress levels induced in the bead seat of prior art.

A main advantage of the present disclosure is that the tire flange and bead seat assembly of a multi-piece wheel rim prevents fretting.

Another advantage of the present disclosure is that the tire flange and bead seat assembly of a multi-piece wheel rim reduces stresses acting on the bead seat.

Still another advantage of the present disclosure is that the tire flange and bead seat assembly of a multi-piece wheel rim enhances rigidity of the bead seat band.

Yet another advantage of the present disclosure is that the tire flange and bead seat assembly facilitates utilization of a tire flange with reduced thickness, thereby reducing weight of the wheel rim.

Still another advantage of the present disclosure is that the tire flange and bead seat assembly increases life of components of the multi-piece wheel rim.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A tire flange and bead seat assembly of a multi-piece wheel rim, comprising:

at least one tire flange (101) including an end face (103*a*) and a circumferentially extending tapered radially inward surface (103*b*) formed as a single continuous taper;

wherein the circumferentially extending tapered radially inward surface (103*b*) includes an outer fillet (104*a*) provided at an edge between a radially extending axially outward surface (101*b*) of the tire flange (101) and the circumferentially extending tapered radially inward surface (103*b*), and an inner fillet (104*b*) provided at the edge between a radially extending axially inward surface (101*a*) of the tire flange (101) and the circumferentially extending tapered radially inward surface (103*b*), wherein the outer filet (104*a*) includes a surface defining a first obtuse angle and wherein the inner filet (104*b*) includes a surface defining a second obtuse angle, wherein the first obtuse angle is greater than the second obtuse angle;

at least one bead seat (201) including a first tapered surface (203*a*) inclined at an angle of θ1 formed on a circumferentially extending radially outward surface (205*a*) of the bead seat (201), and a second tapered surface (203*b*) inclined at an angle of θ2 formed on a circumferentially extending radially inward surface (205*b*) of the bead seat (201), wherein θ1 is greater than θ2;

wherein the circumferentially extending tapered radially inward surface (103*b*) of the tire flange has a taper matching a taper of the first tapered surface (203*a*); and wherein, upon tire inflation, circumferentially extending tapered radially inward surface (103*b*) of the tire flange (101) is completely mounted within the first tapered surface (203*a*) of the bead seat (201), such that tire loads are transferred to the first tapered surface (203*a*) and support reactions are carried by the second tapered surface (203*b*), thereby preventing fretting, reducing stress concentration on the tire flange, and enhancing rigidity of the bead seat in a critical region under load;

wherein the tire flange (101) includes a radially extending axially outward surface (101*b*) and a radially extending axially inward surface (101*a*), wherein the radially extending axially outward surface (101*b*) is divided into an upper surface (102*a*) and a lower surface (102*b*);

wherein a thickness T1 is formed between the upper surface (102*a*) and the radially extending axially inward surface (101*a*) and a thickness T2 is formed between the lower surface (102*b*) and the radially extending axially inward surface (101*a*), wherein the thickness T2 is less than the thickness T1; and wherein the reduced thickness T2 of the lower surface (102*b*) defines a clearance (C) relative to a radially extending axially inward flange surface (207*a*) of a bead seat flange (207), thereby preventing direct contact between the lower surface (102*b*) and the flange surface (207*a*).

2. A tire flange and bead seat assembly of a multi-piece wheel rim, comprising:

at least one tire flange (101) including an end face (103*a*) and a circumferentially extending tapered radially inward surface (103*b*) formed as a single continuous taper;

wherein the circumferentially extending tapered radially inward surface (103*b*) includes an outer fillet (104*a*) provided at an edge between a radially extending axially outward surface (101*b*) of the tire flange (101) and the circumferentially extending tapered radially inward surface (103*b*), and an inner fillet (104*b*) provided at the edge between a radially extending axially inward surface (101*a*) of the tire flange (101) and the circumferentially extending tapered radially inward surface (103*b*), wherein the outer filet (104*a*) includes a surface defining a first obtuse angle and wherein the inner filet (104*b*) includes a surface defining a second obtuse angle, wherein the first obtuse angle is greater than the second obtuse angle;

at least one bead seat (201) including a first tapered surface (203*a*) inclined at an angle of θ1 formed on a circumferentially extending radially outward surface (205*a*) of the bead seat (201), and a second tapered surface (203*b*) inclined at an angle of θ2 formed on a circumferentially extending radially inward surface (205*b*) of the bead seat (201), wherein θ1 is greater than θ2;

wherein the circumferentially extending tapered radially inward surface (103*b*) of the tire flange has a taper matching a taper of the first tapered surface (203*a*); and wherein, upon tire inflation, circumferentially extending tapered radially inward surface (103*b*) of the tire flange (101) is completely mounted within the first tapered surface (203*a*) of the bead seat (201), such that tire loads are transferred to the first tapered surface (203*a*) and support reactions are carried by the second tapered surface (203*b*), thereby preventing fretting, reducing stress concentration on the tire flange, and enhancing rigidity of the bead seat in a critical region under load;

wherein the tire flange (101) includes a radially extending axially outward surface (101*b*) and a radially extending axially inward surface (101*a*), wherein the radially extending axially outward surface (101*b*) is divided into an upper surface (102*a*) and a lower surface (102*b*);

wherein a thickness T1 is formed between the upper surface (102*a*) and the radially extending axially inward surface (101*a*) and a thickness T2 is formed between the lower surface (102*b*) and the radially extending axially inward surface (101*a*), wherein the thickness T2 is less than the thickness T1; and wherein the reduced thickness T2 of the lower surface (102*b*) defines a clearance (C) relative to a radially extending axially inward flange surface (207*a*) of a bead seat flange (207), thereby preventing direct contact between the lower surface (102*b*) and the flange surface (207*a*);

wherein the thickness T1 and T2 of the tire flange (101) are configured in relation to the load acting on the wheel, such that the rigidity of the bead seat (201) is maintained while reducing mass of the tire flange (101).

3. A tire flange and bead seat assembly of a multi-piece wheel rim, comprising:

at least one tire flange (101) including an end face (103*a*) and a circumferentially extending tapered radially inward surface (103*b*) formed as a single continuous taper;

wherein the circumferentially extending tapered radially inward surface (103*b*) includes an outer fillet (104*a*) provided at an edge between a radially extending axially outward surface (101*b*) of the tire flange (101) and the circumferentially extending tapered radially inward surface (103*b*), and an inner fillet (104*b*) provided at the edge between a radially extending axially inward surface (101*a*) of the tire flange (101) and the circumferentially extending tapered radially inward surface (103*b*), wherein the outer filet (104*a*) includes a surface defining a first obtuse angle and wherein the inner filet (104*b*) includes a surface defining a second obtuse angle, wherein the first obtuse angle is greater than the second obtuse angle;

at least one bead seat (201) including a first tapered surface (203*a*) inclined at an angle of θ1 formed on a circumferentially extending radially outward surface (205*a*) of the bead seat (201), and a second tapered surface (203*b*) inclined at an angle of θ2 formed on a circumferentially extending radially inward surface (205*b*) of the bead seat (201), wherein θ1 is greater than θ2;

wherein the circumferentially extending tapered radially inward surface (103*b*) of the tire flange has a taper matching a taper of the first tapered surface (203*a*); and wherein, upon tire inflation, circumferentially extending tapered radially inward surface (103*b*) of the tire flange (101) is completely mounted within the first tapered surface (203*a*) of the bead seat (201), such that tire loads are transferred to the first tapered surface (203*a*) and support reactions are carried by the second tapered surface (203*b*), thereby preventing fretting, reducing stress concentration on the tire flange, and enhancing rigidity of the bead seat in a critical region under load.

4. The tire flange and bead seat assembly as claimed in claim 3, wherein the outer fillet (104*a*) and the inner fillet (104*b*) are provided as curved transitional surfaces at the edges for preventing stress concentration on the tire flange (101).

5. The tire flange and bead seat assembly as claimed in claim 3, wherein the angle relationship of θ1 being greater than θ2 imparts a gradually increasing section in the critical region of the bead seat (201) under load, thereby enhancing rigidity of the bead seat and restricting the tire flange (101)

from establishing contact with a radially extending axially inward flange surface (207*a*) of the bead seat (201) upon tire inflation.

6. The tire flange and bead seat assembly as claimed in claim 3, wherein the tire flange (101) includes a radially extending axially outward surface (101*b*) and a radially extending axially inward surface (101*a*), wherein the radially extending axially outward surface (101*b*) is divided into an upper surface (102*a*) and a lower surface (102*b*);

wherein a thickness T1 is formed between the upper surface (102*a*) and the radially extending axially inward surface (101*a*) and a thickness T2 is formed between the lower surface (102*b*) and the radially extending axially inward surface (101*a*), wherein the thickness T2 is less than the thickness T1; and wherein the reduced thickness T2 of the lower surface (102*b*) defines a clearance (C) relative to a radially extending axially inward flange surface (207*a*) of a bead seat flange (207), thereby preventing direct contact between the lower surface (102*b*) and the flange surface (207*a*).

7. The tire flange and bead seat assembly as claimed in claim 6, wherein the thickness T1 and T2 of the tire flange (101) are configured in relation to the load acting on the wheel, such that the rigidity of the bead seat (201) is maintained while reducing mass of the tire flange (101).

* * * * *